United States Patent

Moeder

[11] Patent Number: 5,910,226
[45] Date of Patent: Jun. 8, 1999

[54] METHOD OF LAMINATING A PLASTIC FILM HAVING TRANSVERSE CORRUGATIONS

[75] Inventor: Claudio Moeder, Voghera, Italy

[73] Assignee: FRA. MO Snc di Franca Riva & C, Voghera, Italy

[21] Appl. No.: 08/765,208

[22] PCT Filed: Jun. 7, 1995

[86] PCT No.: PCT/GB95/01320

§ 371 Date: Apr. 8, 1997

§ 102(e) Date: Apr. 8, 1997

[87] PCT Pub. No.: WO96/01185

PCT Pub. Date: Jan. 18, 1996

[51] Int. Cl.[6] ................................................. B29C 65/00
[52] U.S. Cl. .................. 156/304.5; 156/290; 156/304.5; 156/308.4; 156/322; 156/272.2
[58] Field of Search ................................. 156/306.3, 310, 156/285, 288, 290, 292, 304.1, 323, 322, 304.5, 308.4, 272.2, 309.9

[56] References Cited

U.S. PATENT DOCUMENTS 3,294,387 12/1966 Chavannes .
3,837,973 9/1974 Asakura et al. .

FOREIGN PATENT DOCUMENTS 0166312 1/1986 European Pat. Off. .
2325503 9/1975 France .
551733 3/1948 United Kingdom .
790253 2/1958 United Kingdom .

Primary Examiner—Merrick Dixon
Attorney, Agent, or Firm—Howard & Howard

[57] ABSTRACT

A method of producing corrugated sheets of thermoplastic material by supplying a softened film over an embossing roller to form first, second and third sets of parallel corrugations which radiate from a common center to define a plurality of star shaped cells and sandwiching the corrugated film between outer films to define pockets.

5 Claims, 3 Drawing Sheets

METHOD OF LAMINATING A PLASTIC FILM HAVING TRANSVERSE CORRUGATIONS

This invention relates to a sheet material and in particular relates to a plastics sheet material suitable for use in the packaging industry.

In many ways plastics material is ideally suited for the manufacture of packages, e.g. cartons and the like, especially for the transport of foods such as fruit, vegetables and meat. Plastics materials are generally inert and do not absorb water or any other liquors which may be exuded by the product carried. So-called corrugated plastics material boards are particularly useful in this regard since they combine light weight with relatively rigidity. However, even these boards have the drawback that the rigidity is by far the greatest in the direction of the corrugations while the rigidity of the board in the transverse direction is considerably reduced.

The invention seeks to provide a form of plastics material board or sheet material improved in the above respect.

According to the present invention there is provided a method of producing a corrugated sheet material which comprises supplying a film of thermoplastic material in softened form to an embossing roller, embossing a series of interconnected corrugations onto the film and laminating to the film so embossed to one or more further films so as to produce the corrugated sheet material.

The invention further comprises a corrugated sheet material so made.

The corrugations produced by the embossing roller are "interconnected" by which is meant that all corrugations should not run parallel to one another as with conventional corrugated sheet materials, but that the corrugations run in at least two, and preferably more, directions, thereby intersecting one another. A preferred form of corrugation is in the form of interconnected star shapes as will be described more fully hereinafter. The use of interconnected corrugations leads to several distinct advantages in the method and construction of the invention. Firstly, the rigidity of the sheet in all directions is improved. Secondly, the fact that the corrugations are interconnected leads to areas where air is entrapped and this also enhances the rigidity and impact resistance of the sheet material.

The invention will be described further, by way of example, with reference to the accompanying drawings, in which.

Figure 1:
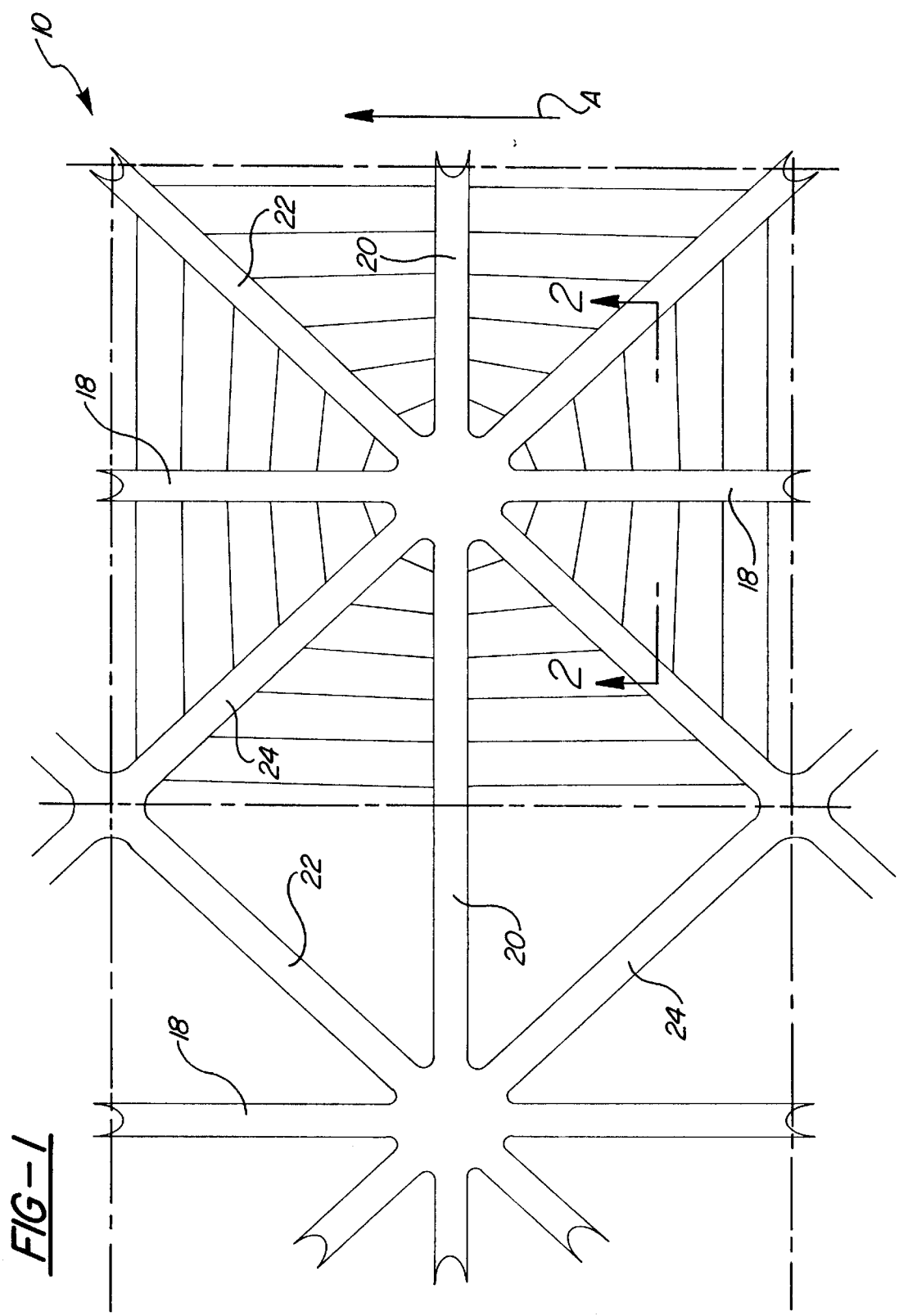
FIG. 1 is a diagrammatic plan view of a sheet material in accordance with the invention.
Figure 2:
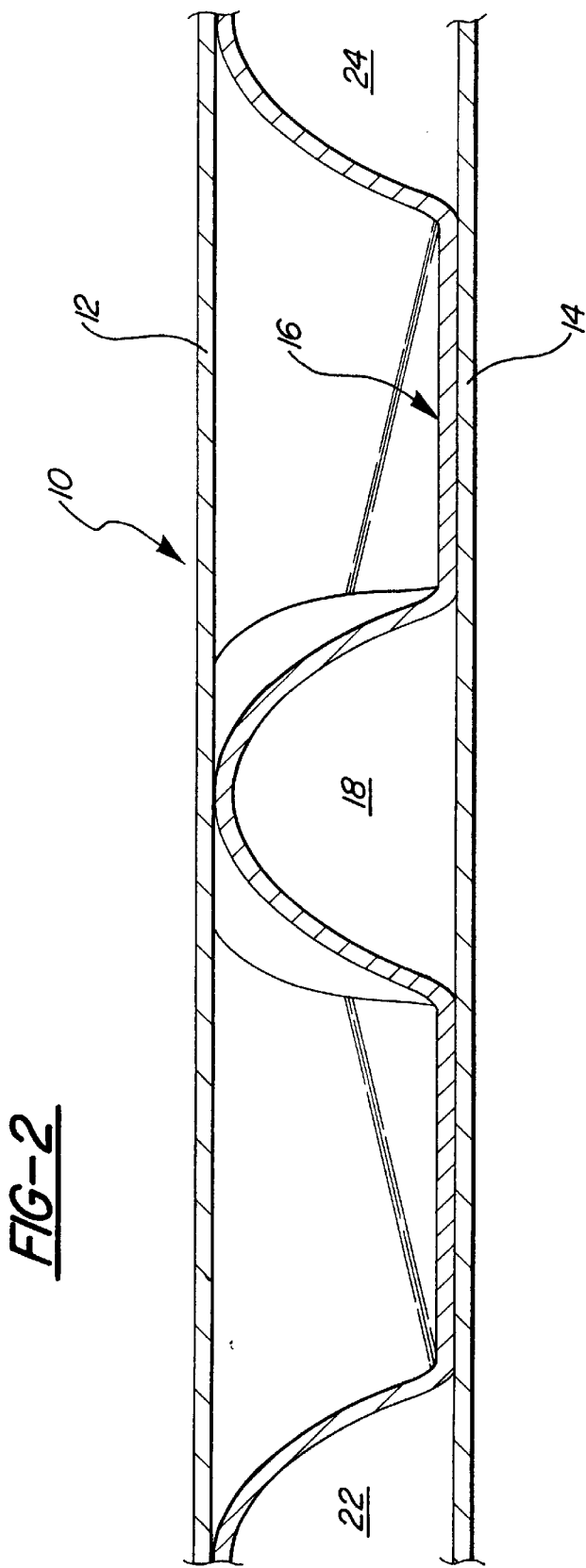
FIG. 2 is a sectional view on line II—II in FIG. 1.

Referring to the drawings, FIGS. 1 and 2 illustrate a corrugated sheet material generally designated 10 in accordance with the invention. This comprises an upper film 12, a lower film 14 and a corrugated film 16 therebetween. The film 16 comprises four series of corrugations which interconnect with one another in a regular manner producing a series of star shaped "cells". Two such cells are illustrated in FIG. 1 but it will be appreciated that the entire sheet has many such cells in a repeating pattern. Assuming arrow A in FIG. 1 to be the direction of production of the sheet, then corrugations 18 are in the direction of production, corrugations 20 are transverse to the direction of production, corrugations 22 are approximately 45° to the right of the production direction and corrugations 24 are approximately 45° to the left of the production direction.

Figure 3:
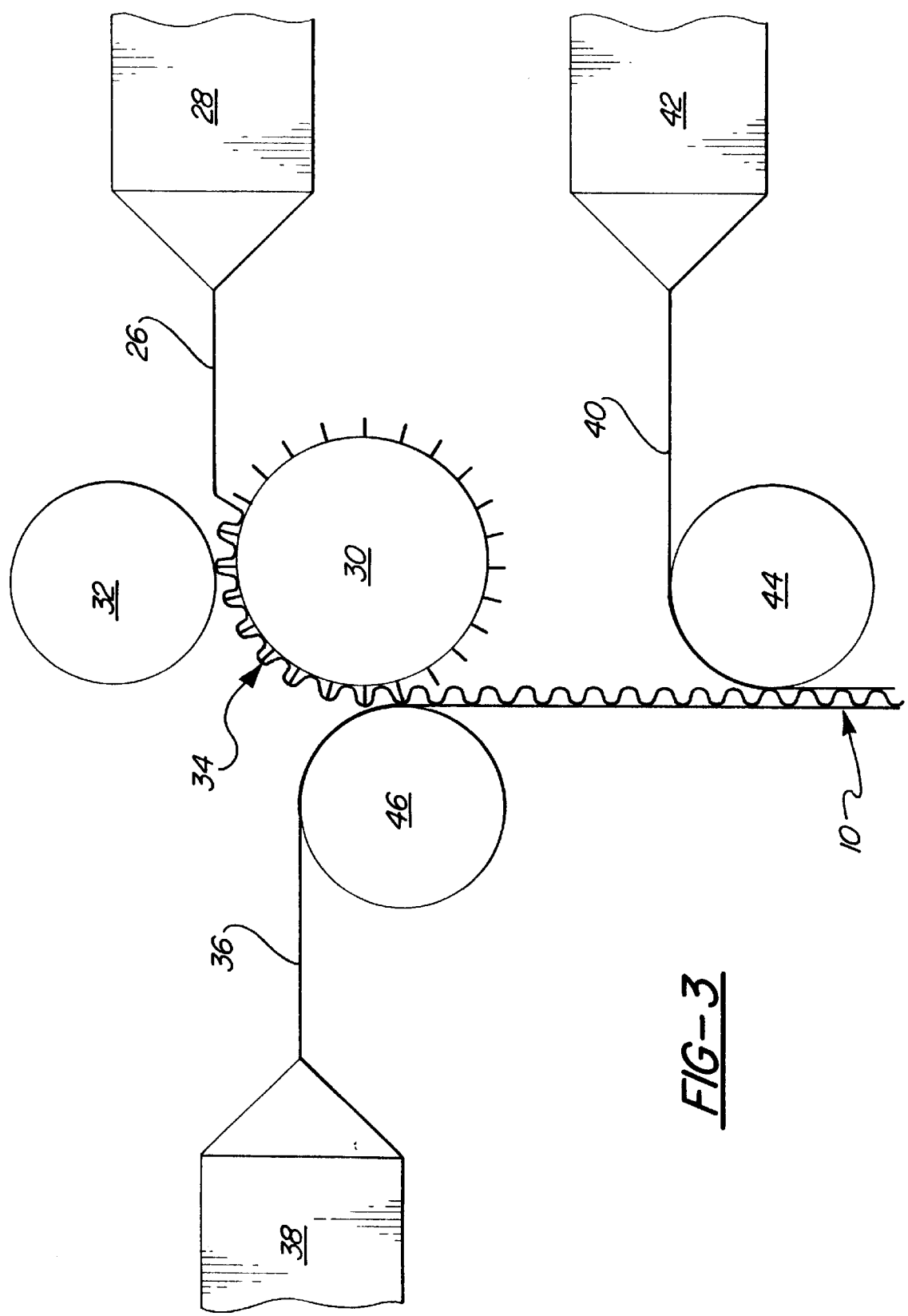
FIG. 3 is a diagrammatic illustration of the method of production of the sheet material.

The sheet 10 may be produced by the apparatus illustrated in FIG. 3. In this, a first film 26 is fed from an extruder 28 into the nip of an embossing roller 30 and a co-operating chill roller 32. The surface 34 of the roller 30 is embossed with a pattern corresponding to the star shaped cells of corrugations 18, 20, 22, and 24. It is preferred that the corrugations stand proud of the roller surface, but the opposite configuration, with areas forming the corrugations recessed, may be employed. The surface 34 of the roller 30 is also perforated and the roller is adapted to be connected to a source of vacuum so as to ensure that the film 26 is pulled fully into the interstices of the embossed surface 34. The roller 32 not only aids the film taking up the shape of the embossed surface 34 but, by its chilling action, stabilises the film so that the embossed shape is retained as it leaves the surface 34 of the roller 30.

Before the latter occurs, a second film 36 also provided in a softened form from an extruder 38 is applied to the outer surface of the film 26, now embossed. The film 36 adheres to the surface of the embossed film 26 and forms the bottom of the eventual sheet material 10. If desired, and as illustrated in FIG. 3, a further film 40 supplied by an extruder 42 is applied to the other surface of the embossed film 26 to produce the complete film as illustrated in FIGS. 1 and 2. Rollers 44 and 46 may be chill rollers in order to stabilise the applied film after it has adhered it to the embossed film 26 so that the finally produced sheet material 10 is stable and will not deform.

As can be seen from FIG. 1, the interconnecting corrugations 18, 20, 22, 24 lead to a number of completely enclosed zones within which air is trapped. This adds to the rigidity and stability of the sheet as a whole. Moreover the fact that the various series of corrugations are at angles to one another ensures that effectively the sheet is rigid in all directions approximately equally in contrast to the form of corrugated sheet in which the corrugations are all parallel.

The sheet of the invention may be produced from any suitable plastics material but is particularly preferred to be produced from plastics material such as ABS, polystyrene, or especially polyolefins. Re-cycled material may be used. However, where the end product is for the use in the transportation or storage of food, it is preferred that at least the film 36 or 40, which will be in contact with the food, be produced from virgin material to avoid the possibility of contamination. However the sheet 26, and possibly the other of the sheets 36 or 40, may be produced from re-cycled material even when the sheet 10 is for use in food transportation packaging.

I claim:

1. A method of producing corrugated sheet material comprising:
    softening a film of thermoplastic material,
    supplying the softened film to an embossing roller,
    embossing a first set of parallel corrugations into the film,
    embossing a second set of parallel corrugations into the film in transverse relationship to the first set of parallel corrugations, and
    laminating the film to a first outer film of thermoplastic material by softening the first outer film and adhering the films together at the outer extremities of the corrugations.

2. A method as set forth in claim 1 further characterized by embossing a third set of parallel corrugations into the film in transverse relationship to each of the first and second sets of corrugations respectively.

3. A method as set forth in claim 2 further characterized by forming the second set of corrugations 45° from the first set of corrugations and forming a third set of corrugations 45° from each of the first and second sets of corrugations respectively.

4. A method as set forth in claim 3 further characterized by laminating a second outer film of thermoplastic material to the opposite outer extremities of the first set and second set of corrugations to sandwich the corrugated film between the first and second outer films.

5. A method as set forth in claim 3 further characterized by forming the first, second and third sets of corrugations to cross one another at a plurality of spaced centers.

* * * * *